G. A. SQUIRE.
CARBURETER ATTACHMENT FOR INTERNAL COMBUSTION ENGINES.
APPLICATION FILED MAR. 13, 1916.
1,217,233.
Patented Feb. 27, 1917.
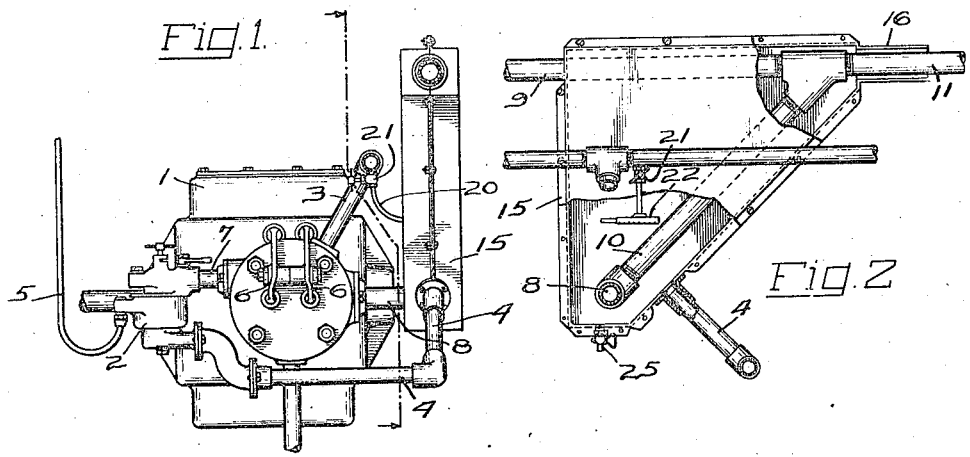
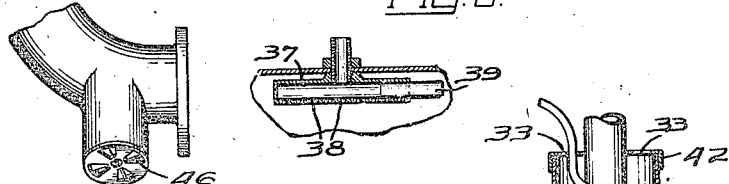
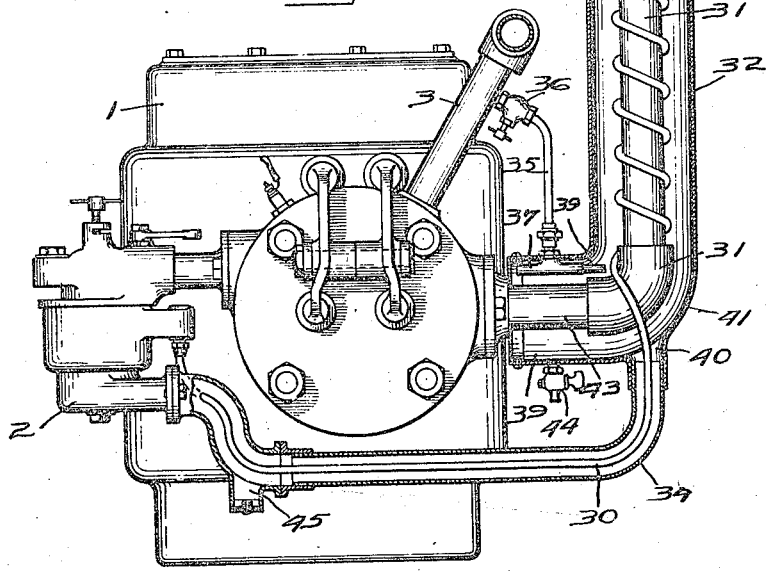
INVENTOR
George A. Squire
by

UNITED STATES PATENT OFFICE.

GEORGE A. SQUIRE, OF RUDOLPH, OHIO.

CARBURETER ATTACHMENT FOR INTERNAL-COMBUSTION ENGINES.

1,217,333.

Specification of Letters Patent.

Patented Feb. 27, 1917.

Application filed March 13, 1916. Serial No. 83,867.

*To all whom it may concern:*

Be it known that I, GEORGE A. SQUIRE, a citizen of the United States, and a resident of Rudolph, in the county of Wood and State of Ohio, have invented a certain new and useful Carbureter Attachment for Internal-Combustion Engines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to engines, and it particularly relates to an attachment for carbureters. It has for its object to provide a means whereby a fuel having a high firing point may be vaporized and mixed with air by means of any well-known form of carbureter used in connection with gasolene engines. It also provides a means whereby a water vapor may be directed to the carbureter and mixed with the fuel.

The invention may be contained in many forms of constructions usable for engines of different types, all of which come within the purview of my claims hereinafter appended. To show the practicability of my invention I have selected one of such constructions as an example and shall describe it hereinafter. The construction selected is illustrated in the accompanying drawings.

Figure 1 of the drawing illustrates an end view of a horizontal engine showing an exterior view of the construction containing the invention. Fig. 2 is a side view of the attachment, parts being shown as broken away to more fully illustrate the construction. Fig. 3 is an illustration of a modification of the invention wherein means is provided for heating the fuel, in advance of it being fed to the carbureter. Fig. 4 illustrates an auxiliary valve for regulating to a certain extent the temperature of the air and of the fuel supplied to the carbureter. Fig. 5 illustrates an adjustable means for regulating the water vapor that is supplied with the heated air to the carbureter.

1, Fig. 1, is the engine. 2 is the carbureter. 3 is the pipe forming part of the water cooling system of the engine. 4 is a pipe leading to the intake of the carbureter through which the air passes to the carbureter. 5 is the pipe which supplies the fuel to the carbureter. 6, 6 are valves which control the fuel supply and the exhaust to the cylinders of the engine. 7 is the pipe leading to the engine cylinder which supplies the combustible mixture, and 8 is the exhaust of the cylinder which appears in Fig. 1. 9 is the exhaust pipe of the other cylinder of the engine. The pipes 8 and 9 are connected together by means of the pipe 10. The exhaust pipe 11 conveys away the exhaust products from the exhaust pipes 8 and 9. The pipes 9, 10 and 11 form a Y for conducting the exhaust products from the engine. A casing 15 is provided for inclosing the pipes or portions thereof. The end of the pipe 8 extends into the chamber of the inclosing casing 15. The pipe 9 also extends into the casing 15. The casing 15 thus incloses the portions of pipes 8, 9 and 11 and also pipe 10. The casing 15 is provided with a sleeve 16 through which the pipe 11 extends. The inner diameter of the sleeve 16 is a little larger than the exterior diameter of the pipe 11. The sleeve 16 thus forms a narrow annular chamber about the pipe 11 and also an air inlet into the casing 15. The sleeve 16 thus brings the air that enters through its end into close contact with the exhaust pipe 11 and causes the air to be heated by the exhaust pipe. The air enters the interior of the casing where the pipes 8, 9 and 10, or portions thereof, are located, and consequently it is further heated. The air is conducted through the pipe 4 from the casing 15 to the carbureter 2. In the carbureter it mixes with the fuel which is fed by the pipe 5 after the manner well known in the art.

The cooling system having the pipe 3 is also provided with a connection to the casing 15, to supply a small amount of water in the form of steam to the heated air, which passes from the casing 15. Any source of water supply may be used but I have found it convenient to draw on the water in the cooling system of the engine as the heated water passes from the engine. A pipe 20 connects with the pipe 3. The pipe 20 is provided with the valve 21 to regulate the flow of the water through the pipe 20. The pipe 20 terminates in a nozzle 22 which is located within the casing 15. It sprays or sprinkles the water on the exhaust pipe 19 or on the exhaust pipes 8 and 10 which turns the water into steam, and mixes with the air as it passes through the casing 15. The heated air and water vapor passes through the pipe 4 to the carbureter and mixes with the liquid fuel which is fed to the carbureter through the pipe 5, where it is carbureted and then is directed to the engine through the pipe 7.

A modified form of the construction is illustrated in Fig. 3 wherein the carbureter 2 is provided with a fuel supply pipe 30 which is heated also by the products of combustion of the engine. In the engine shown in Fig. 3, 31 is the exhaust pipe through which the products of combustion are conveyed from the engine. A pipe or sleeve 32 surrounds the exhaust pipe 31 and is provided with openings 33 to admit air into the interior of the pipe or sleeve 32. The pipe or sleeve 32 is connected to the carbureter 2 by means of the pipe 34 which conveys to the carbureter the air which is heated by the exhaust pipe 31 as the air passes through the chamber within the sleeve or pipe 32. The pipe 3 for conveying the heated water from the engine is connected by means of a pipe 35 to the interior of the sleeve 32. The pipe 35 is also provided with a valve 36 for regulating the supply of the hot water which flows from pipe 3. The pipe 35 terminates in a nozzle 37 which is located within the chamber of the sleeve 32 and above a horizontal portion 43 of the pipe 31. The nozzle 37 is provided with a plurality of openings 38 through which the water may drip on to the horizontal portion 43 of the pipe 31, where it is vaporized or turned to steam. The nozzle 37 is also provided with a plug 39 which may be adjustably positioned within the nozzle 37 to close one or more of the openings 38 and thus coact with the valve 36 to control the flow of hot water through the nozzle 37, and consequently the amount of water vapor mixed with the air which is directed to the carbureter. The nozzle 37 is located in a portion 39 of the chamber of the sleeve 32, which is positioned at one side of the exit 40 of the sleeve 32. The portion 39 of the chamber is thus heated to a high temperature by the exhaust products of the engine as they leave the engine, and is not cooled by the air which circulates through the sleeve 32, the exit 40 for the air from the sleeve 32 being located at the elbow 41 of the sleeve. The water falls on the highly heated portion 42 of the exhaust pipe and mixes with the air at one end of the portion 39 of the chamber of the sleeve 32 and passes with the air to the carbureter.

The fuel pipe 30 extends from the carbureter 2 and leaves the pipe 34 at a point near its connection with the carbureter. The fuel supply pipe extends through the pipe 34, the exit 40 of the sleeve 32 and around the exhaust pipe 31 to and through one of the openings 35 formed in the cap 42 located on the upper end of the sleeve 32. The fuel is thus heated as it passes through the pipe 30 by the exhaust products of the engine. By this means crude oil or other oils of high kindling point may be vaporized by the carbureter 2 which may be of any ordinary type of carbureter used for carbureting gasolene.

An auxiliary opening 45 may be formed in the pipe 34 near the point of its connection with the carbureter 2. The opening 45 may be provided with a damper 46 as shown in Fig. 4 for varying the area of the opening 45. This will, to a certain extent, regulate the temperature of the air supplied to the carbureter and is found useful when the temperature of the atmosphere is high, as in the summer season.

The construction selected and described may be greatly modified in the arrangement and manufacture of its parts and in the substitution of elements having equivalent functions, and such modifications may be used in connection with internal combustion engines of different types and still contain the invention.

Having thus described my invention, what I claim as new and desire to secure by Letters Patent, is—

1. In combination with the exhaust pipe of an engine, an attachment for carbureters surrounding the exhaust pipe and having an air inlet, a pipe connecting the attachment to the carbureter for conducting air heated by the exhaust pipe to the carbureter, a source of water supply, a nozzle located above the exhaust pipe and connected to the source of water supply and located within the attachment, the carbureter having a fuel supply pipe also located in the said attachment and heated by the exhaust pipe, a damper located in the pipe connecting the attachment with the carbureter and in proximity to the carbureter for admitting the cool air of the atmosphere and controlling the heated air.

2. In combination with the exhaust pipe of an engine, an attachment for carbureters surrounding the exhaust pipe and having an air inlet, a pipe connecting the attachment with the carbureter, a source of water supply, a nozzle located above the exhaust pipe and connected to the source of water supply and located within the attachment, the carbureter having a fuel supply pipe also located in the said attachment and spirally surrounding the exhaust pipe and extending through the pipe connecting the attachment with the carbureter and heated by the exhaust pipe, a damper located in the pipe connecting the attachment with the carbureter and in proximity to the carbureter for admitting the cool air of the atmosphere and controlling the heated air and the steam and to minimize cooling of the fuel in the fuel pipe.

In testimony whereof, I have hereunto signed my name to this specification.

GEORGE A. SQUIRE.